July 18, 1950     P. F. SHIVERS     2,515,969
GRAVITY SENSITIVE VARIABLE INDUCTANCE DEVICE
Original Filed Sept. 24, 1942
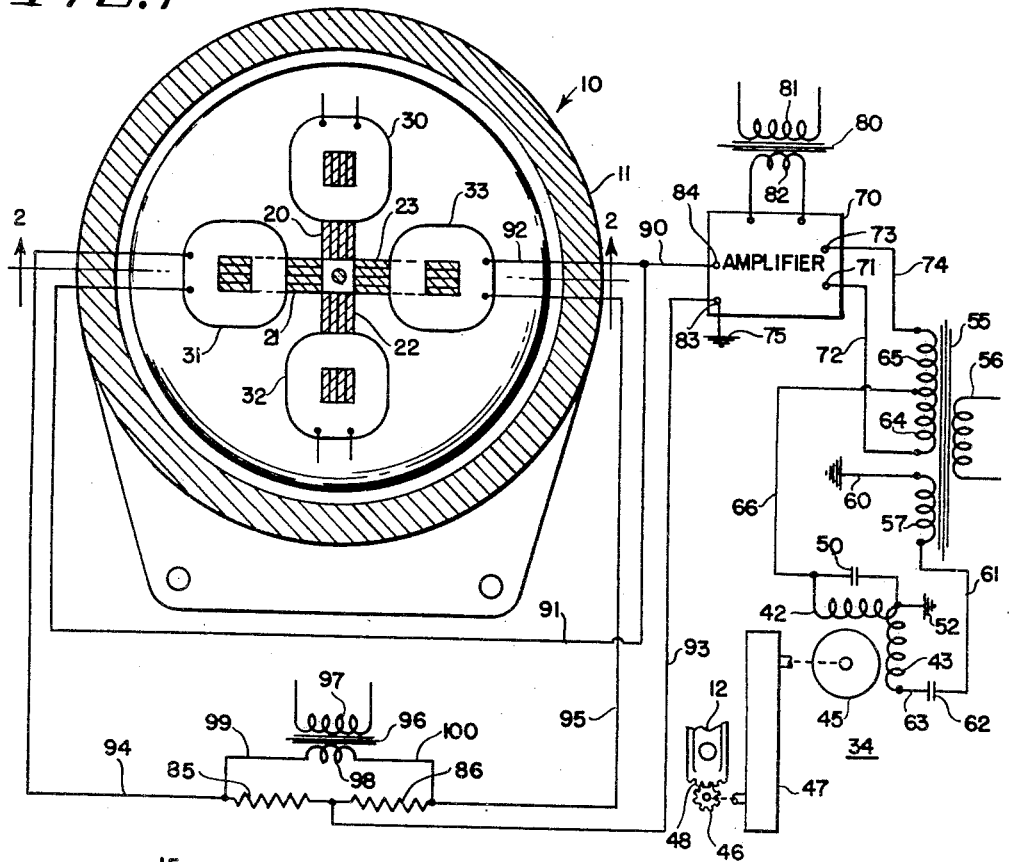
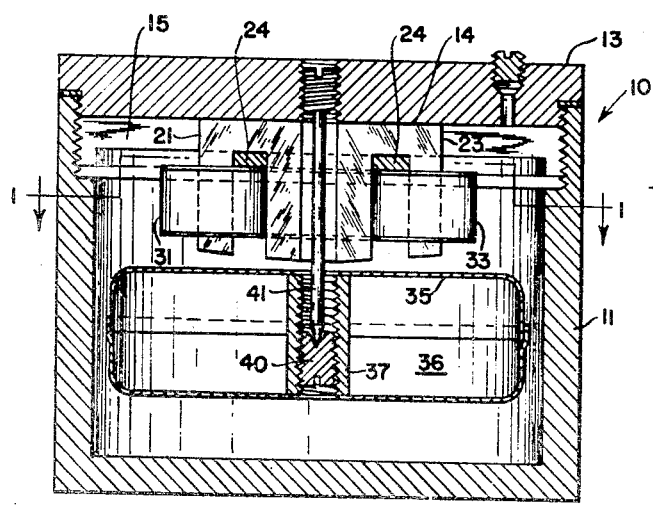
Inventor
PAUL F. SHIVERS
George H Fisher
Attorney Patented July 18, 1950

2,515,969

UNITED STATES PATENT OFFICE 2,515,969

GRAVITY SENSITIVE VARIABLE INDUCTANCE DEVICE

Paul F. Shivers, Edina, Minn., assignor to Minneapolis-Honeywell Regulator Company, Minneapolis, Minn., a corporation of Delaware Original application September 24, 1942, Serial No. 459,517, now Patent No. 2,492,244, dated December 27, 1949. Divided and this application May 28, 1949, Serial No. 96,047

8 Claims. (Cl. 171—242)

The present invention is directed to a gravity sensing electric control device and more particularly to an improved gravity responsive magnetic pickup unit. This application is a division of the copending application of Paul F. Shivers, Serial No. 459,517, on a Leveling Support, filed September 24, 1942, now Patent No. 2,492,244, dated December 27, 1949.

It is an object of this invention to provide an improved gravity influenced magnetic pickup which is substantially unaffected by accelerations.

Another object of this invention is to provide a simple design of magnetic pickup of the gravity responsive type which is highly accurate and sensitive and economical to manufacture and maintain.

These and other objects will be apparent from the following detailed description; from the claims, and from the drawings, in which:

Figure 1 is an elevation of the device together with a schematic diagram of the electric circuit which it controls, and Figure 2 is a sectional view of the pickup taken along the line 2—2 of Figure 1.

Referring now to the drawing, the gravity sensitive magnetic pickup is indicated generally at 10 in Figures 1 and 2. This pickup is designed to control a pair of electric motors for the purpose of maintaining an object carried by a platform susceptible to tilting in a level position. Reference should be made to the main application of the applicant, referred to above, for the disclosure of the subject gravity sensitive control device in a camera leveling system. Since the details of the mounting and the ultimate control system form no part of the subject invention, they are omitted here, and the control device is described as if attached to an object such as the camera supports of the before-mentioned application to control the energization of a pair of levelling motors which level the support with respect to a horizontal plane irrespective of the tilt of the aircraft or platform carrying the camera.

Magnetic pickup 10 includes a cup 11 which is adapted to be secured to an object, such as a camera support 12. The cup 11 is screw-threaded internally at its upper or open edge to receive a cover 13. The lower surface 14 of the cover 13 is provided with a pair of grooves 15 disposed at right angles to each other. The grooves 15 are adapted to receive four U-shaped laminated iron core members 20, 21, 22 and 23 disposed radially about the center of the cover 13 with each core member having its legs depending therefrom. Any suitable means such as clamps 24, may be provided to secure the core members in fixed position in the grooves 15 in the cover 13. The outer legs of the core members have coils 30, 31, and 32, 33 respectively, mounted thereon.

Opposite pairs of these coils are connected to cooperate in controlling leveling motors, only one leveling motor 34 being shown herein, but it being understood that the coils 30, 32 control through a similar circuit a second motor similar in detail to motor 34 for leveling the object about a second axis. A single iron armature 35 cooperates with all of the U-shaped core members 20, 21, 22 and 23. The armature 35 comprises the upper surface of a float 36. The float 36 is provided with a sleeve 37 extending downwardly through its center, which sleeve is screw-threaded internally to receive an adjustable bearing member 40 provided with a conical bearing surface at its upper end. A float pivot 41 comprising a pointed rod is provided with screw threads at its upper end which cooperate with corresponding threads in an opening through the cover 13. The float pivot 41 extends downwardly from the center of the cover 13 between the inner legs of the U-shaped core members. The lower end of the float pivot 41 is conical in shape and cooperates with the float bearing 40. The normal spacing between the core members and the armature 35 may be adjusted by turning the float pivot 41 in the cover 13. The entire space within the cup 11 around the float 36, the core members 20, 21, 22 and 23, the coils 30, 31, 32 and 33 is filled with a suitable liquid. A filling plug is provided in the cover 13 for the purpose of filling this space with liquid.

The float pivot 41 pivots the float 36 at a point corresponding to the center of gravity of the float 36. This adjustment may be obtained by turning the bearing 40 in the sleeve 37. The float is so constructed that the center of gravity thereof is appreciably below the center of bouyancy thereby urging the float 36 into engagement with pivot 41. When the cup 11 is tilted in various directions, the float will tilt to vary the distance between the armature 35 and the various core members to obtain the control affect to be hereinafter described since the float is pivoted at a point below its center of buoyancy. Lateral accelerations of the device will, however, have substantially no effect on the position of the float 36 since it is pivoted at its center of gravity.

Magnetic pickup 10 is shown in Figure 1 in conjunction with the leveling motor 34 which positions the object 12 on which the pickup unit 10 is mounted. It is to be understood that the object is mounted on suitable gimbals (not shown) for tilt about the pair of axes with which the coils of pickup 10 are aligned. Only one motor and its associated means of energization is shown; the other leveling motor and its circuit for the opposite axis, being identical with the former, is omitted for simplicity.

The motor 34 includes a pair of windings 42 and 43 which drive an armature 45. The armature 45 drives the pinion 46 through the reduction gearing 47 and cooperates with the gear segment 48 to position the object 12. The windings 42 and 43 of the motor 34 are spaced ninety electrical degrees apart in accordance with the conventional construction of split phase induction motors. A condenser 50 is connected in parallel with winding 42. The common terminal of the windings 42 and 43 is grounded at 52.

The capacitance of the condenser 50 and the inductance of winding 42 is so proportioned that the two form a series resonant loop circuit. This loop circuit is supplied with energy by transformer action from winding 43, but the current flow in winding 42 caused by this transformer action is not sufficient, or of proper phase relationship, to cause rotation of the armature 45. When a slight additional amount of energy is supplied to winding 42, however, it is energized sufficiently to start rotation of the armature 45 in a direction determined by the phase of such additional energy supplied to the winding.

A transformer 55 having a primary winding 56 is provided with a secondary winding 57, one end of which is grounded at 60. The other end of the winding 57 is connected by a wire 61, a condenser 62, and a wire 63 to the end of the motor winding 43 which is not grounded. Since the winding 43 is supplied with current through the condenser 62, the phase of the alternating current in this winding is substantially ninety degrees out of phase with that in the secondary winding 57 of the transformer 55. The motor winding 42 when energized is supplied with alternating current from a secondary winding 64 or secondary winding 65 of the transformer 55. The junctions between windings 64 and 65 are connected to the motor winding 42 by means of a wire 66. An amplifier 70 which is similar to that described in the Albert P. Upton Patent No. 2,423,534, granted July 8, 1947, has an output terminal 71 which is connected to the secondary winding 64 of the transformer 55 by a wire 72, and an output terminal 73 which is connected to the secondary winding 65 by a wire 74. The amplifier 70 is supplied with power from a transformer 80 having a primary winding 81 and a secondary winding 82. The amplifier 70 is also provided with input terminals 83 and 84, the terminal 83 being grounded at 75. One or the other of the secondary windings 64, 65 of transformer 55 through the control of the amplifier 70, supply winding 42 with alternating current of a given phase, or the opposite, depending upon the relation between the phase of the alternating signal impressed on the input terminals and the phase of the voltage existing in the secondary windings 64, 65 of the transformer 55. The direction of rotation of armature 45 of motor 34, as previously pointed out, depends upon the phase of the current supplied to the winding 42. Therefore, the direction of rotation of armature 45 will depend upon the phase of the signal impressed upon the input terminals of the amplifier 70. When no signal is impressed on the input terminals of the amplifier 70, no current is supplied to the motor winding 42 and the armature 45 of the motor 34 remains stationary.

The input terminals 83 and 84 of the amplifier 70 are connected to a bridge circuit including the coils 31 and 33 of the pickup unit 10. The bridge circuit also includes a pair of equal resistances 85 and 86 which are connected in parallel with the coils 31 and 33. The input terminal 84 of the amplifier 70 is connected to the pickup coil 31 by means of wires 90 and 91, and is connected to the pickup coil 33 by means of wires 90 and 92. A wire 93 interconnects the junction between the resistances 85 and 86 and the input terminal 83 of the amplifier 70. The pickup coil 31 is connected to the resistance 85 by a wire 94, while the pickup coil 33 is connected to the resistance 86 by a wire 95. A transformer 96 having a primary winding 97 supplies power to the bridge circuit from its secondary 98 which is connected to the resistance 85 by means of a wire 99 and to the resistance 86 by means of a wire 100. The primary 97 of the transformer 96 must be connected to the same source of alternating current as the primary 56 of the transformer 55 in order that there be a definite relationship between the phase existing in the bridge circuit and that in the secondary windings of the transformer 55. Preferably, the second winding 98 of the transformer 96 may be a supplementary secondary winding on the transformer 55.

The operation of the control circuit of Figure 1 is as follows: when the armature 35 is in mid-position or equally spaced with respect to core members 21, 23, the inductance of the pickup coils 31 and 33 is the same. As pointed out before, the junction between the coils 31 and 33 is connected to the input terminal 84 of the amplifier 70. The junction between the two equal resistances 85 and 86 is connected to the input terminal 83 of the amplifier 70. An alternating potential is applied across the two resistances 85 and 86, and also across the two coils 31 and 33. Since the inductances of the coils 31 and 33 are normally equal and since the value of the resistances 85 and 86 is the same, the junction between the coils 31 and 33 and the junction between the resistances 85 and 86 are at the same potential. Hence no alternating current signal is applied to the input terminals of the amplifier 70. As heretofore pointed out, when no signal is impressed on the amplifier 70, there can be no energization of motor winding 42 and the armature 45 of the motor 34 remains at rest. This is the condition which exists when pickup unit 10 is in its proper position with respect to the horizon. The object 12 schematically illustrated in Figure 1 is similarly in its normal position and no operation of the motor 34 is required.

In case the object 12 and hence the pickup unit 10 are tilted from their respective normal positions the armature 35 is relatively tilted with respect to the base and hence the core members 21, 23, assuming the tilt to be such that float 36 moves clockwise about pivot 41 bringing armature 35 close to core 21 and away from core 23, the inductance of the pickup coil 31 is increased and that of the coil 33 decreased. With this condition the potential of the junction between the coils 31 and 33 and therefore the potential of the input terminal 84 of the amplifier 70 is no longer at the same value as the junction between the resistances 85 and 86 and therefore of the input terminal of the amplifier 83. Hence, an alternating signal is applied to the input terminals of the amplifier 70 and current flows in motor winding 42 of such a phase as to cause the armature 45 to rotate in a direction to move the object with respect to its support so as to return the object to its normal position and the armature 35 of pickup 10 to neutral position with respect to the core members and base 13. When this condition is attained, a signal will no longer be impressed on the amplifier and the motor 34 will cease operation.

Likewise, if the object is tilted in the opposite direction, the armature is similarly tilted with respect to the core members 21, 23 in the opposite counterclockwise direction and, the inductance of the coil 33 is increased and that of the coil 31 decreased. The potential of the junction between the coils 31 and 33 is no longer equal to the potential at the junction between the resistances 85 and 86 and an alternating signal is impressed on the input terminals 83 and 84 of the amplifier 70. This alternating potential is, however, 180 electrical degrees out of phase with the signal which was impressed on the amplifier when the armature 35 was moved in a clockwise direction. This signal when applied to the amplifier 70 will result in a current flow in the winding 42 of the motor 34 of such a phase relationship with respect to the current flowing in the winding 43, that the armature 45 rotates in such a direction as to reposition the object 12 with respect to its normal position and to relevel the pickup device 10. Sufficient movement of the pickup 10 will reposition the core members with respect to the armature 35 to the position shown in which the inductances of the two coils 31 and 33 are equal. When this condition exists there is no longer a signal impressed on the input terminals of amplifier 70 and the motor winding is no longer energized and the armature 45 comes to rest. Although the operation of the device has been described as resulting from a movement of armature 35 about the pivot 41, it should be remembered that in the actual operation of the device the float 36 and hence the armature 35 remains in a substantially fixed horizontal position and it is the movement of the base 13 and the core members 21, 23 with respect to the true vertical which causes actuation of the motor.

The coils 30, 32 of the pickup mounted in the opposite axis and which are connected into a similar circuit (not shown) to control the leveling motor (not shown) for the opposite axis are identical in structure and operate in conjunction with armature 35 in an identical manner to that described above. Therefore a description of their operation is omitted.

The magnetic pickup 10 can thus sense tilt from vertical about two axes normal to one another and control the leveling of an object with respect to these axes. The pickup is simple and compact and is not subject to the adverse affect of acceleration thereupon. This disclosure is intended to be illustrative only and the scope of the invention herein is to be determined only by the appended claims.

I claim as my invention:

1. Gravity influenced control means, comprising in combination, a base subject to inclinations from a normal position, electrical coils mounted on said base, magnetic circuit means for said coils including core members, a container on said base having a liquid therein, a float completely immersed in said liquid and having an armature integral therewith for cooperating with said core members in varying the inductance of said coils, pivot means for said float located substantially at the center of gravity thereof and below the center of buoyancy, said pivot means being carried by said base.

2. A gravity influences control means comprising in combination, a base adapted to be mounted such as to be subject to inclinations from a normal position about a pair of axes normal to one another and lying in the same plane, a plurality of U-shaped core members secured to said base and arranged in diametrically opposed pairs, said pairs of core members being disposed normal to one another and normal to an axis about which said base is adapted to tilt with each core member spaced equidistantly from a common point, an inductance coil mounted on one leg of each of said core members, pivot means secured to said base at said common point, float means including a magnetic element adapted to pivot on said pivot means and disposed to tilt toward and away from said plurality of core members, and casing means enclosing said float means and said core members secured to said base and containing a liquid which buoys said float means into engagement with said pivot means.

3. A gravity influences control means comprising in combination, a base adapted to be mounted such as to be subject to inclinations from a normal position about a pair of axes normal to one another and lying in the same plane, a plurality of U-shaped core members secured to said base and arranged in diametrically opposed pairs, said pairs of core members being disposed normal to one another and normal to an axis about which said base is adapted to tilt with each core member spaced equidistantly from a common point, an inductance coil mounted on one leg of each of said core members, pivot means secured to said base at said common point, float means including a magnetic element adapted to pivot on said pivot means and disposed to tilt toward and away from said plurality of core members, and casing means enclosing said float means and said core members secured to said base and containing a liquid which buoys said float means into engagement with said pivot means, said float means having a bearing surface which engages said pivot means and is adjustable to vary the locus of engagement of said float means and said pivot means with respect to said float means.

4. A gravity influences control means comprising in combination, a base adapted to be mounted such as to be subject to inclinations from a normal position about a pair of axes normal to one another and lying in the same plane, a plurality of U-shaped core members secured to said base and arranged in diametrically opposed pairs, said pairs of core members being disposed normal to one another and normal to an axis about which said base is adapted to tilt with each core member spaced equidistantly from a common point, an inductance coil mounted on one leg of each of said core members, pivot means secured to said base at said common point, float means including a magnetic element adapted to pivot on said pivot means and disposed to tilt toward and away from said plurality of core members, and casing means enclosing said float means and said core members secured to said base and containing a liquid which buoys said float means into engagement with said pivot means, said pivot means being adjustable within said base to vary the locus of engagement of said float means and said pivot means with respect to said base.

5. In a device of the class described, a base subject to inclinations from a normal position, a magnetic core structure including a portion comprising a plurality of core members and a portion comprising a magnetic armature, inductance coils adapted for energization and mounted on said core members, one of said portions of said core structure being secured to the said base, the other cf said portions of a core member being carried by said float and adapted to be pivoted on a pivot secured to said base, means including an enclosure means secured to said base and adapted to be filled with a liquid for urging said float into engagement with said pivot and causing tilt of said float with respect to said base upon inclination of said base from said normal position, said portions of said core structure upon tilt of said base being relatively movable to vary the inductance of said coils on said core members.

6. In a device of the class described, a base subject to inclinations from a normal position, a magnetic core structure including a portion comprising a plurality of core members and a portion comprising a magnetic armature, inductance coils adapted for energization and mounted on said core members, one of said portions of said core structure being secured to the said base, the other of said portions of said core member being carried by a float and adapted to be pivoted on a pivot secured to said base, means including an enclosure means secured to said base and adapted to be filled with a liquid for urging said float into engagement with said pivot and causing tilt of said float with respect to said base upon inclination of said base from said normal position, said portions of said core structure upon tilt of said base being relatively movable to vary the inductance of said coils on said core members, and means for varying the locus of engagement of said pivot and said float.

7. In a device of the class described, a base subject to inclinations from a normal position, a magnetic core structure including a portion comprising a plurality of core members and a portion comprising a magnetic armature, inductance coils adapted for energization and mounted on said core members, one of said portions of said core structure being secured to the said base, the other of said portions of said core member being carried by said float and adapted to be pivoted on a pivot secured to said base, means including an enclosure means secured to said base and adapted to be filled with a liquid for urging said float into engagement with said pivot and causing tilt of said float with respect to said base upon inclination of said base from said normal position, said portions of said core structure upon tilt of said base being relatively movable to vary the inductance of said coils on said core members, and means for varying the spacing between the relatively movable portions of said magnetic core structure.

8. In a device of the class described, in combination: a magnetic core structure including a plurality of relatively movable magnetic members one of which carries an inductance coil, one of said magnetic members being secured to a base and subject to tilt therewith, pivot means secured to said base, and means including a liquid filled container secured to said base enclosing a float means holds another of said magnetic members into pivotal engagement with said pivots and maintains said magnetic member in a normal position with respect to a horizontal plane, said magnetic members upon relative movement causing variation in the inductance in said coil.

PAUL F. SHIVERS.

REFERENCES CITED

The following references are of record in the file of this patent:

UNITED STATES PATENTS

| Number | Name | Date |
|---|---|---|
| 2,366,346 | Malone | Jan. 2, 1945 |

FOREIGN PATENTS

| Number | Country | Date |
|---|---|---|
| 489,556 | Germany | Dec. 11, 1923 |
| 716,131 | France | Oct. 5, 1931 |

Certificate of Correction

Patent No. 2,515,969.

July 18, 1950

PAUL F. SHIVERS

It is hereby certified that error appears in the printed specification of the above numbered patent requiring correction as follows:

Column 7, line 10, and column 8, line 5, for the word "said" read *a*; column 8, line 26, after "means" insert *which*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*